(12) United States Patent
Swadi

(10) Patent No.: US 6,659,199 B2
(45) Date of Patent: Dec. 9, 2003

(54) BEARING ELEMENTS FOR DRILL BITS, DRILL BITS SO EQUIPPED, AND METHOD OF DRILLING

(75) Inventor: Mohammad Swadi, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/929,537

(22) Filed: Aug. 13, 2001

(65) Prior Publication Data

US 2003/0034181 A1 Feb. 20, 2003

(51) Int. Cl.$^7$ .............................................. E21B 10/46
(52) U.S. Cl. ........................................ 175/57; 175/431
(58) Field of Search .......................... 175/57, 431, 430, 175/336, 374, 394, 397, 398

(56) References Cited

U.S. PATENT DOCUMENTS

| 1,805,678 | A | 5/1931 | Smith |
| 2,198,849 | A | 4/1940 | Waxler |
| 2,563,515 | A | 8/1951 | Brown |
| 2,624,549 | A | 1/1953 | Wallace |
| 2,684,835 | A | 7/1954 | Moore |
| 2,776,817 | A | 1/1957 | Gregory et al. |
| 3,153,458 | A | 10/1964 | Short |
| 3,303,894 | A | 2/1967 | Varney |
| 3,709,308 | A | 1/1973 | Rowley et al. |
| 3,779,323 | A | 12/1973 | Horten et al. |
| 4,351,401 | A | 9/1982 | Fielder |
| 4,386,669 | A | 6/1983 | Evans |
| 4,499,958 | A | 2/1985 | Radtke et al. |
| 4,554,986 | A | 11/1985 | Jones |
| 4,718,505 | A | 1/1988 | Fuller |
| 4,763,737 | A | 8/1988 | Hellnick |
| 4,823,892 | A | 4/1989 | Fuller |
| 4,889,017 | A | 12/1989 | Fuller et al. |
| 4,942,933 | A | 7/1990 | Barr et al. |
| 4,981,184 | A | 1/1991 | Knowlton et al. |
| 4,982,802 | A | 1/1991 | Warren et al. |

(List continued on next page.)

FOREIGN PATENT DOCUMENTS

EP   0 605 151 A1   12/1993

OTHER PUBLICATIONS

1995 Hughes Christensen 1995 Drill Bit Catalog, p. 31.
Hughes Christensen Bit Drawing dated May 29, 1997—HC Part No. CC201918.
Hughes Christensen Bit Drawing dated Sep. 18, 1996—HC Part No. CW210655.
Hughes Christensen Bit Drawing dated Sep. 18, 1996—HC Part No. CS205023.
Hughes Christensen Bit Drawing dated Sep. 9, 1996—HC Part No. CC201718.
International Search Report dated Sep. 6, 2002.

*Primary Examiner*—David Bagnell
*Assistant Examiner*—Zakiya Walker
(74) *Attorney, Agent, or Firm*—TraskBritt

(57) ABSTRACT

A rotary drag bit carrying PDC cutters and elongated bearing elements associated with at least some of the PDC cutters on the bit face thereof Lateral positioning and angular positioning of the elongated bearing elements are adjusted so that all portions of an elongated bearing element travel substantially completely within a tubular clearance volume defined by the path through the formation being drilled by a PDC cutter with which that elongated bearing element is associated, the associated PDC cutter being positioned at about the same radius from the bit centerline as the elongated bearing element. A method of drilling and a method of drill bit design are also disclosed.

42 Claims, 3 Drawing Sheets

U.S. PATENT DOCUMENTS

| | | |
|---|---|---|
| 4,991,670 A | 2/1991 | Fuller et al. |
| 5,010,789 A | 4/1991 | Brett et al. |
| 5,042,596 A | 8/1991 | Brett et al. |
| 5,090,492 A | 2/1992 | Keith |
| 5,111,892 A | 5/1992 | Sinor et al. |
| 5,131,478 A | 7/1992 | Brett et al. |
| 5,186,268 A | 2/1993 | Clegg |
| 5,199,511 A | 4/1993 | Tibbitts et al. |
| 5,222,566 A | 6/1993 | Taylor et al. |
| 5,244,039 A | 9/1993 | Newton, Jr. et al. |
| 5,265,685 A | 11/1993 | Keith et al. |
| 5,287,936 A | 2/1994 | Grimes et al. |
| 5,303,785 A | 4/1994 | Duke |
| 5,314,033 A | 5/1994 | Tibbitts |
| 5,346,026 A | 9/1994 | Pessier et al. |
| 5,388,649 A | 2/1995 | Ilomäki |
| 5,402,856 A | 4/1995 | Warren et al. |
| 5,435,403 A | 7/1995 | Tibbitts |
| 5,467,836 A | 11/1995 | Grimes et al. |
| 5,492,186 A | 2/1996 | Overstreet et al. |
| 5,531,281 A | 7/1996 | Murdock |
| 5,558,170 A | 9/1996 | Thigpen et al. |
| 5,595,252 A | 1/1997 | O'Hanlon |
| 5,655,612 A | 8/1997 | Grimes et al. |
| 5,663,512 A | 9/1997 | Schader et al. |
| 5,706,906 A | 1/1998 | Jurewicz et al. |
| 5,730,234 A | 3/1998 | Putot |
| 5,957,227 A | 9/1999 | Besson et al. |
| 5,979,577 A | 11/1999 | Fielder .................. 175/431 |
| 6,003,623 A | 12/1999 | Miess |
| 6,050,354 A | 4/2000 | Pessier et al. |
| 6,123,161 A | 9/2000 | Taylor |
| 6,298,930 B1 | 10/2001 | Sinor et al. ............. 175/428 |
| 6,460,631 B2 * | 10/2002 | Dykstra et al. .......... 175/57 |

* cited by examiner

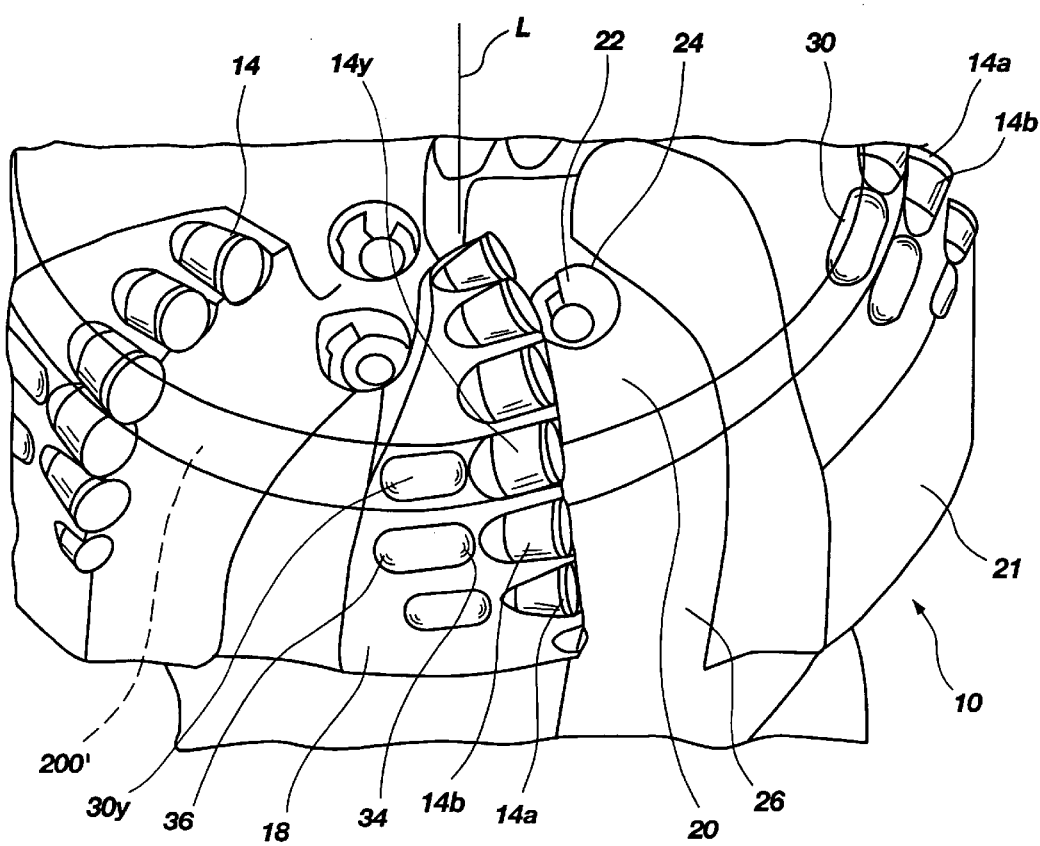
Fig. 3
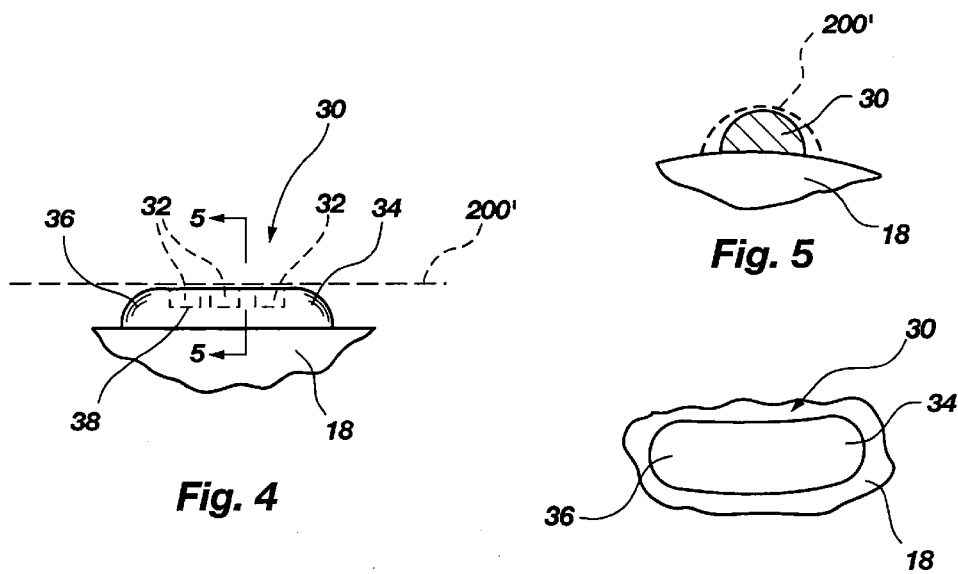
Fig. 4
Fig. 5
Fig. 6

BEARING ELEMENTS FOR DRILL BITS, DRILL BITS SO EQUIPPED, AND METHOD OF DRILLING

BACKGROUND OF THE INVENTION

Field of the Invention: The present invention relates generally to drill bits for drilling subterranean formations and, more specifically, to preferentially positioned and oriented elongated bearing elements for rotary drag bits and rotary drag bits so equipped.

State of the Art: Rotary drag bits employing polycrystalline diamond compact (PDC) cutters have been employed for several decades. PDC cutters are typically comprised of a disc-shaped polycrystalline diamond "table" formed on and bonded under high-pressure, high-temperature conditions to a supporting substrate such as cemented tungsten carbide (WC), although other configurations are known. Rotary drag bits carrying PDC cutters, which may be brazed into pockets in the bit face or blades extending from the face or mounted to studs inserted into the bit body, have proven very effective in achieving high rates of penetration (ROP) in drilling subterranean formations exhibiting low to medium compressive strengths. Recent improvements in hydraulic design of rotary drag bits, cutter design and drilling fluid formulation have reduced prior, notable tendencies of such bits to "ball" by increasing the volume of formation material which may be cut before exceeding the ability of the bit and its associated drilling fluid flow to clear the formation cuttings from the bit face.

Numerous attempts using varying approaches have been made over the years to protect the integrity of diamond cutters and their mounting structures, to limit cutter penetration into a formation being drilled, and to generally stabilize rotary drag bits during operation. For example, from a period even before the advent of commercial use of PDC cutters, U.S. Pat. No. 3,709,308 discloses the use of trailing, round natural diamonds on the bit body to limit the penetration of cubic diamonds employed to cut a formation. U.S. Pat. No. 4,351,401 discloses the use of surface-set natural diamonds at or near the gage of the bit as penetration limiters to control the depth of cut of PDC cutters on the bit face. Other patents disclose the use of a variety of structures immediately trailing PDC cutters (with respect to the direction of bit rotation) to protect the cutters or their mounting structures: U.S. Pat. Nos. 4,889,017, 4,991,670, 5,244,039 and 5,303,785. U.S. Pat. No. 5,314,033 discloses, inter alia, the use of cooperating positive and negative or neutral back rake cutters to limit penetration of the positive rake cutters into the formation. Another approach to limiting cutting element penetration is to employ structures or features on the bit body rotationally preceding (rather than trailing) PDC cutters, as disclosed in U.S. Pat. Nos. 3,153,458, 4,554,986, 5,199,511 and 5,595,252.

In another context, a bearing surface on the bit body is aligned with a resultant radial force generated by cutters thereon to preclude so-called bit "whirl" by maintaining contact of the bearing surface with the wall of the borehole. See also U.S. Pat. Nos. 4,982,802, 5,010,789, 5,042,596, 5,111,892, 5,131,478 and 5,402,856.

So-called "wear knots" have been deployed behind PDC cutters on the face of a rotary drag bit in an attempt to provide enhanced stability in some formations, notably interbedded soft, medium and hard rock. Drill bits drilling such formations easily become laterally unstable due to the wide and constant variation of resultant forces acting on the drill bit due to engagement of such formations with the PDC cutters carried on the face. Wear knots comprise structures in the form of bearing elements projecting from the bit face and which conventionally rotationally trail some of the PDC cutters at substantially the same radial locations, usually at positions from the nose of the bit extending down the shoulder to proximate the gage. Conventionally, wear knots may comprise elongated segments having arcuate, such as half-hemispherical, leading ends, taken in the direction of bit rotation. The wear knots project from the bit face a lesser distance than the projections, or exposures, of their associated PDC cutting elements and are typically of lesser width than a rotationally leading, associated PDC cutter and thus, consequently, than the groove in the formation cut by that PDC cutter. One notable deviation from such design approach is disclosed in U.S. Pat. No. 5,090,492, wherein so-called "stabilizing projections" rotationally trail certain PDC cutters on the bit face and are sized in relation to their associated cutters to purportedly snugly enter and move along the groove cut by the associated leading cutter in frictional, but purportedly noncutting relationship to the side walls of the groove.

It has been observed by the inventor herein that the presence of bearing elements in the form of wear knots, while well-intentioned in terms of enhancing rotary drag bit stability, falls short in practice due to deficiencies in the positioning and orientation of the wear knots. Notably, current wear knot designs and placements, rather than the wear knot riding completely within a groove cut by an associated, rotationally leading PDC cutter, result in some portion, and in some instances a substantial portion, of each wear knot exterior surface contacting the uncut rock adjacent the groove and exciting, rather than reducing, lateral vibration of the bit.

BRIEF SUMMARY OF THE INVENTION

The present invention provides a well-reasoned, easily implementable bit design particularly suitable for rotary drag bits, which bit design may be tailored to a specific ROP or range of ROPs. In the inventive bit design, lateral positioning and angular positioning of elongated bearing elements on the bit face as well as their respective dimensions and configurations may be adjusted so that all portions of an elongated bearing element travel completely within a tubular clearance volume defined by the path through the formation being drilled by a PDC cutter with which that elongated bearing element is associated, the PDC cutter being positioned at about the same radius from the bit centerline as the elongated bearing element.

PDC cutters of a rotary drag bit travel along helical paths as the bit drills ahead into the formation. The helix pitch of a cutter, in units of distance (for example, inches) per revolution is related to ROP and bit rotational speed, measured in revolutions per minute. The determined pitch, in combination with a radial position of a PDC cutter on the bit, may be used to determine the slope of the helical path cut by that cutter in the formation.

The elongated bearing elements of the present invention may rotationally trail an associated PDC cutter in an immediately circumferentially adjacent position, or by a substantial arc around the bit face. In practice, an elongated bearing element may trail an associated PDC cutter by a circumferential distance in excess of 180°, so as to actually be rotationally leading another, different PDC cutter traveling along a path lying at about the same radius from the centerline of the bit as the elongated bearing element.

In one embodiment, elongated bearing elements may be configured as elongated, half-cylindrical segments having non-aggressive leading and trailing ends to preclude inadvertent cutting of formation material, for example, a rotationally leading half-hemispherical end and a rotationally trailing half-hemispherical end. Each elongated bearing element substantially correspond to a portion of a circular path traversed by an associated PDC cutter at substantially the same radius as the bit rotates. The outermost face, or bearing surface, of each elongated bearing element may be oriented (as the bit is normally situated during drilling) at an angle with respect to the centerline generally corresponding to the slope of the helical path traversed by its associated PDC cutter for a given ROP or designed range of ROPs as the bit drills ahead into the formation.

It is specifically contemplated that elongated bearing elements according to the pesent invention may be applied to coring bits, bi-center bits, eccentric bits, reaming tools and other drilling structures as well as to full-bore drill bits. As used herein, the term "bit" encompasses all of the foregoing drilling structures. Moreover, the present invention is not limited to any particular structure for rotary drag bits and may be applied with equal utility both to matrix-type rotary drag bits as well as steel body bits and bits of various constructions, including without limitation bits formed by stereolithographic, or so-called "layered manufacturing," techniques, as known in the art.

Methods of designing rotary drag bits are also encompassed by the present invention, as are methods of drilling.

BRIEF DESCRIPTION OF THE SEVERAL VIEWS OF THE DRAWINGS

FIG. 3 is an enlarged, inverted, partial perspective view of a portion of the bit face of the rotary drag bit of FIG. 1 having elongated bearing elements in the form of wear knots positioned and oriented in accordance with the present invention;

FIG. 4 comprises an enlarged side elevation of an elongated bearing element according to the present invention on an exterior surface of a drill bit, depicting its position from a side view relative to a path cut through formation rock by an associated cutter;

FIG. 5 comprises a transverse section taken through the elongated bearing element as depicted in FIG. 4, taken along line 5—5 thereof; and FIG. 6 comprises a top elevation of an arcuately elongated bearing element according to the present invention.

DETAILED DESCRIPTION OF THE INVENTION

Figure 1:
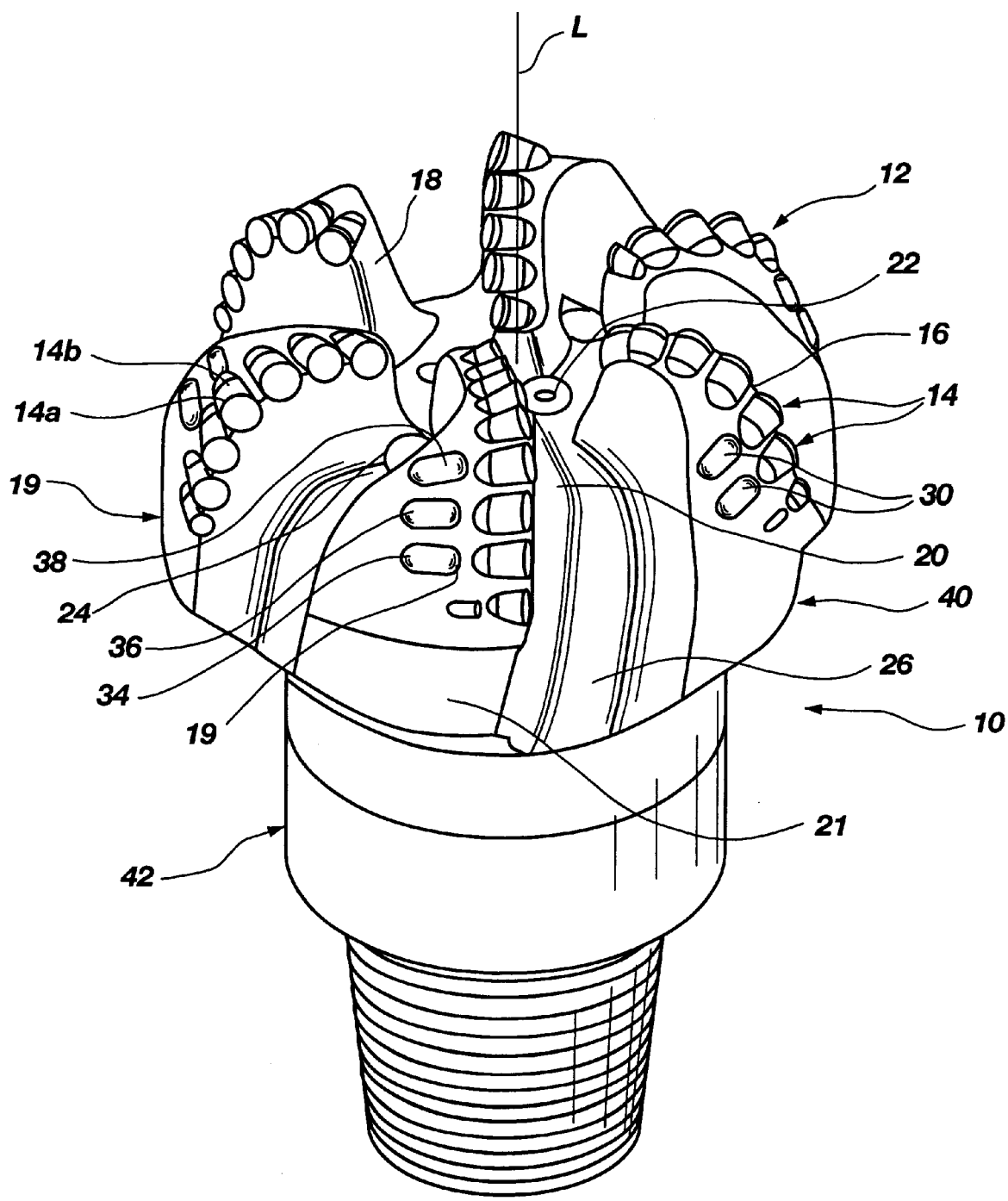
FIG. 1 is an inverted perspective view of the rotary drag bit according to the present invention.

Referring to the drawings, FIG. 1 depicts a rotary drag bit 10 according to the present invention inverted for clarity of illustration from its usual drilling orientation and at its face or leading 12 as if the viewer were slightly above and off to one side. Bit 10 includes a plurality of PDC cutters 14 comprising polycrystalline diamond tables 14a formed and bonded to substrates 14b and bonded by their substrates 14b, as by brazing, into pockets 16 in blades 18 extending above the face 12, as is known in the art with respect to the fabrication of so-called "matrix" -type bits as well as some steel body bits. Matrix-type bits include a mass of metal powder, such as tungsten carbide, infiltrated with a molten, subsequently hardenable binder, such as a copper-based alloy, while steel body bits are generally machined from a casting. It should be understood, however, that the present invention is not limited to matrix-type bits or cast and machined steel body bits, and bits of other manufacture may also be configured according to the present invention.

Fluid courses 20 lie between blades 18 and are provided with drilling fluid by nozzles 22 secured in nozzle orifices 24, nozzle orifices 24 being at the end of passages leading from a plenum extending into the bit body 40 from a tubular shank 42 at the trailing end of the bit which may be threaded on its exterior surface as known in the art to connect bit 10 to a drill string. Fluid courses 20 extend to junk slots 26 extending downwardly (as bit 10 is oriented) along the side of bit 10 between blades 18. Gage pads 19 comprise longitudinally upward extensions of blades 18 and may have wear-resistant inserts or coatings on radially outer surfaces 21 thereof as known in the art. Formation cuttings are swept away from PDC cutters 14 by drilling fluid emanating from nozzles 22 which moves generally radially outwardly through fluid courses 20 and then upwardly through junk slots 26 to an annulus between the drill string from which the bit 10 is suspended and the wall of well bore, and on to the surface.

A plurality of elongated bearing elements 30, each comprising an elongated segment, resides on blades 18. Wear-resistant elements or inserts 32 (FIG. 4), in the form of tungsten carbide bricks or discs, diamond grit, diamond film, natural or synthetic diamond (PDC or TSP), cubic boron nitride, a ceramic or other robust, wear-resistant material as known in the art, may be placed on the exterior bearing surfaces or added to the exterior bearing surfaces of elongated bearing elements 30 to reduce the abrasive wear thereof by contact with the formation under WOB as the bit 10 rotates under applied torque. In lieu of inserts, the bearing surfaces may be comprised of, or completely covered with, a wear-resistant material. Referring to FIGS. 1 and 4 of the drawings, elongated bearing elements 30 further each comprise a nonaggressively (so as not to snag or grab formation rock during drilling) shaped leading end 34 and trailing end 36 (taken in the direction of bit rotation during use), each being adjacent a nonaggressively shaped major body portion 38 of elongated bearing element 30. One suitable shape for ends 34 and 36 is a half-hemisphere in the case of major body portion 38 of elongated bearing element 30 being configured as, for example, a half-cylinder. Of course, elongated bearing elements 30 may project (or be exposed) varying distances above the surface of a blade 18 or other portion of bit body 40, the outer surfaces of elongated bearing elements 30 being exposed less than the exposure of PDC cutters 14 with which they are associated so as to not inhibit the cutting action thereof. Elongated bearing elements 30 may be linear in elongation, or arcuate, the latter being depicted in FIG. 6. If arcuately elongated, a bearing element 30 may be formed on an arc having a radius substantially equal to the radial distance between that elongated bearing element 30 and the centerline L of the rotary drag bit 10. As noted above, the longitudinal extent of major body portion 38 of an elongated bearing element 30 may be sloped to match the angle of the helical path relative to a plane perpendicular to the bit centerline L and traversed by a PDC cutter 14 with which that elongated bearing element 30 is associated for a given ROP or range of ROPs and to thus provide a large, elongated bearing surface against the formation rock rather than being limited to point contact therewith in the instance of harder formations. The helix pitch, in terms of inches of penetration of the bit into the formation being drilled per each revolution of the bit, may be characterized by the following equation:

$$\text{Helix Pitch (in/rev)} = \frac{\text{ROP(ft/hr)} \times 12(\text{in/ft})}{\text{RPM(rev/min)} \times 60(\text{min/hr})}$$

The figure reached by use of the above equation equals, of course, the depth of cut of all of the PDC cutters on the bit during a single revolution of the bit at a given ROP and RPM. However, as will be understood and appreciated by those of ordinary skill in the art, a cutter on a rotating bit at a radial location nearer the gage will travel a much greater circumferential path about and transverse to the bit centerline L than a cutter which is located quite near the centerline L during a single revolution of the bit. Thus, it is intuitively obvious that the slope of the helical path for the cutter closer to the centerline L (being shorter in circumferential extent for a given longitudinal penetration of the bit into the formation) will be substantially steeper than that of the cutter closer to the gage (being longer in circumferential extent for a given longitudinal penetration of the bit into the formation). Accordingly, the orientation (slope) of the bearing surface of an elongated bearing element may be fine-tuned to substantially match the slope of the helix cut by the PDC cutter 14 with which it is associated and at substantially the same radius from centerline L. In addition, the elongated bearing elements 30 according to the present invention are sized and configured in transverse cross-section so as to lie well within the envelope of the helical path 200' cut by an associated PDC cutter 14, as illustrated in FIG. 5 of the drawings.

As characterized herein, the configuration of an elongated bearing element 30 refers to the configuration extending above the surface of a blade 18 or other portion of bit body 40 carrying that particular elongated bearing element 30, any portion thereof extending into a blade 18 or bit body 40 being configured as desired or required to secure elongated bearing element 30 to bit 10 as well known in the art and forming no part of the present invention.

In the case of matrix-type bits, by way of example and not limitation, elongated bearing elements 30 may be formed of protrusions of the infiltrated matrix material of the bit body 40 extending into cavities formed on the interior surface of the bit mold cavity which defines the exterior shape of the bit body. The wear-resistance of the elongated bearing elements 30 may be augmented, by way of example only, by placing diamond grit within the matrix material adjacent the outer surface of the elongated bearing elements 30 prior to infiltration of the bit body. In the case of steel body bits, the elongated bearing elements may be formed from a hardfacing material applied to the steel body. The use of hardfacing to form wear knots on bit bodies is disclosed and claimed in copending U.S. patent application Ser. No. 09/715,406 filed Nov. 17, 2000 and assigned to the assignee of the present invention, the disclosure of which application pertaining to the formation of wear knot structures being incorporated herein by this reference.

Hardfacing is generally composed of some form of hard particles delivered to a surface via a welding delivery system. Hardfacing refers to the deposited material rather than the constituent materials which make up the hardfacing. Constituent materials of hardfacing are referred to as a hardfacing composition. Hard particles may come from the following group of cast or sintered carbides consisting of chromium, molybdenum, niobium, tantalum, titanium, tungsten, and vanadium and alloys and mixtures thereof, as disclosed by U.S. Pat. No. 5,663,512 to Schader et al., assigned to the assignee of the present invention and the disclosure of which is incorporated by reference herein. Commonly, a mixture of sintered, macrocrystalline, or cast tungsten carbides is captured within a mild steel tube. The steel tube containing the carbide mixture is then used as a welding rod to deposit hardfacing onto the desired surface, usually with a deoxidizer, or flux.

The shape, size, and relative percentage of different hard particles will affect the wear and toughness properties of the deposited hardfacing, as described by Schader et al. U.S. Pat. No. 5,492,186 to Overstreet, assigned to the assignee of the present invention and the disclosure of which is incorporated by reference herein, describes a hardfacing configuration for heel row teeth on a roller cone drill bit. The coating comprises two hardfacing compositions tailored for different properties. A first hardfacing composition may be characterized by good sliding wear resistance and/or abrasion resistance with a lower level of toughness. The second hardfacing composition contains carbide particles of spherical sintered, crushed sintered and cast tungsten carbide. A substantial portion of the particles in the second composition are characterized by a higher level of fracture resistance, or toughness, and a lower level of abrasion resistance. Thus, the characteristics of hardfacing may be customized to suit the purposes of the structure formed thereby.

For reference purposes, rotary drag bit 10 as illustrated may be said to be symmetrical or concentric about its centerline or longitudinal axis L, although this is not necessarily a requirement of the invention. In the case of rotary drag bit 10, the elongated bearing elements 30 are configured and placed to substantially exactly match the pattern drilled in the bottom of the borehole by at least one associated PDC cutter placed at substantially the same radius from the centerline L.

Figure 2:
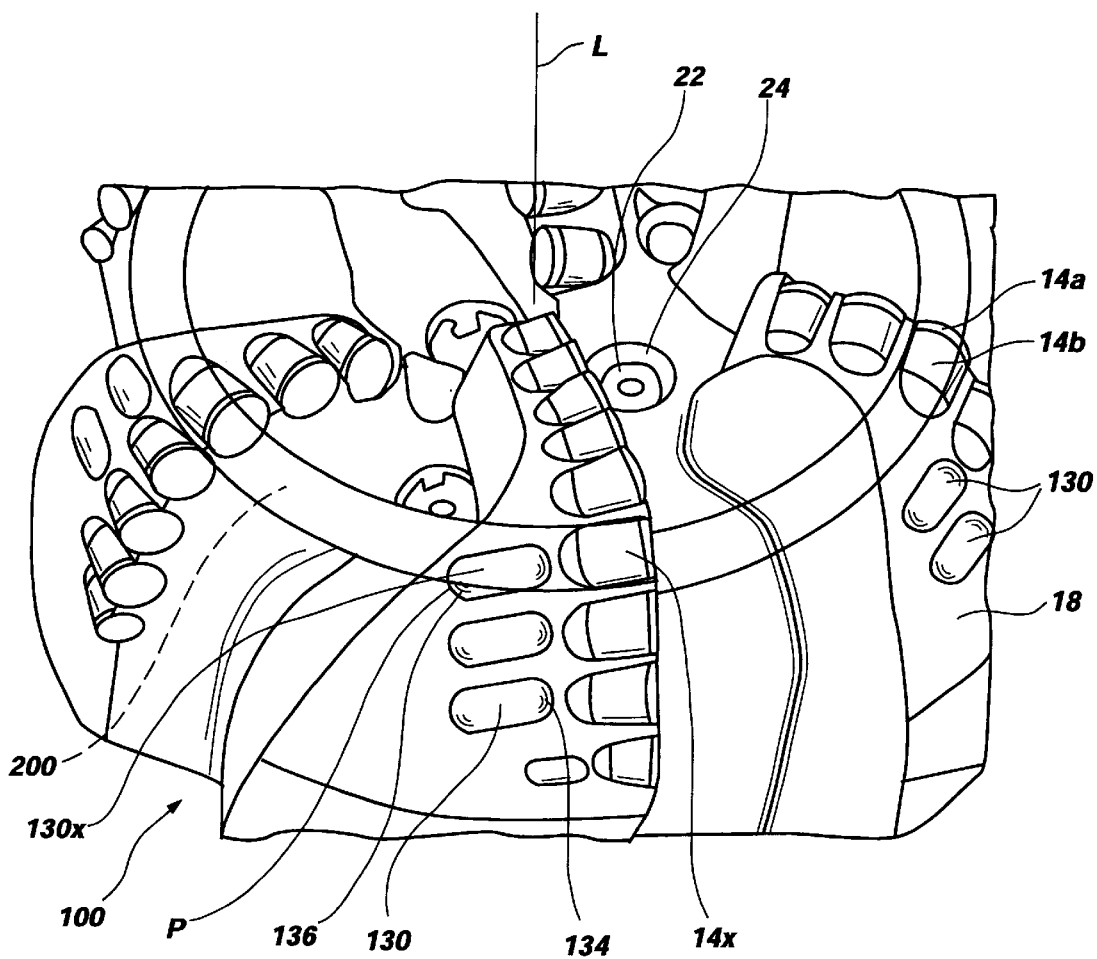
FIG. 2 is an enlarged, inverted, partial perspective view of a portion of the bit face of a prior art rotary drag bit showing wear knots positioned and oriented in a conventional manner.

With reference to FIGS. 2 and 3 of the drawings, the present invention will be described in additional detail. Elements and features previously described with respect to FIGS. 1, 4 and 5 of the drawings are identified by the same reference numerals in FIGS. 2 and 3.

FIG. 2 depicts a conventional rotary drag bit 100 of a design similar to that of rotary drag bit 10 according to the present invention. It will be appreciated that rotary drag bit 100 employs wear knots 130, such structures having half-hemispherical leading ends 134 and trailing ends 136. It will be appreciated by reference to the helical path 200 traversed by PDC cutter 14x leading wear knot 130x at about the same radial distance from centerline L that wear knot 130x, and specifically the trailing end 136 thereof, protrudes or penetrates as indicated at P beyond the extent of the path traveled and defined by PDC cutter 14x. With rotary drag bit 100 actually drilling a formation, this penetration of the tubular envelope defining helical path 200 indicates that trailing end 136 of wear knot 13x will contact rock adjacent the helical path 200 and uncut by PDC cutter 14x, consequently exciting rather than reducing lateral vibration of rotary drag bit 100.

FIG. 3, on the other hand, depicts an enlarged perspective similar to that of FIG. 2 but of rotary drag bit 10 according to the present invention as previously described with respect to FIG. 1. Rotary drag bit 10 employs elongated bearing elements 30, such structures having half-hemispherical leading ends 34 and trailing ends 36, although other nonaggressive configurations for leading and trailing ends 34 and 36 are also contemplated for use with and encompassed by the present invention. It will be appreciated by reference in FIG. 3 to the helical path 200' traversed by PDC cutter 14y leading elongated bearing element 30y at about the same radial distance from centerline L that elongated bearing element 30y, including both leading end 34 and trailing end 36, lies in its entirety within the extent of the path traveled by PDC cutter 14y and the resulting tubular envelope. With rotary drag bit 10 actually drilling a formation, this lack of penetration of the tubular envelope associated with helical path 200' indicates that elongated bearing element 30y will not contact rock adjacent the helical path 200' and uncut by PDC cutter 14y and instead ride within the tubular envelope of helical path 200', consequently reducing rather than exciting lateral vibration of rotary drag bit 100 as the outer surface of elongated bearing element 30y rides on the wall of rock within the groove cut therein by PDC cutter 14y.

During design of a rotary drag bit according to the present invention, positioning of each elongated bearing element 30 with respect to a helical path 200' and its associated tubular envelope may be verified using conventional computer aided design (CAD) software. The lateral or side-to-side positioning of each elongated bearing element 30 as well as the angular orientation or rotation of a bearing element 30 about an axis perpendicular to the bit face at the location of a given elongated bearing element 30 may be adjusted at the design stage and prior to fabrication of the actual rotary drag bit to ensure that each elongated bearing element 30 tracks substantially wholly within a tubular envelope of a helical path 200'. Further, the dimensions of a bearing element may be adjusted, as well as the configuration thereof. For example, a bearing element may be shortened, or changed from a linearly elongated configuration to a nonlinear, such as arcuately elongated, configuration. Still further, the configuration of the bearing element may be changed in the context of adjusting the slope of the bearing surface of the elongated bearing element. The helical path 200' may be generated for at least one selected ROP, or for a range of ROPs at which the bit is intended to drill, protrusion or lack thereof of a given bearing element 30 through a tubular envelope of a helical path 200' at each end of the ROP range being verified.

The cutters employed with rotary drag bit 10 referenced herein have been described as PDC cutters, but it will be recognized and appreciated by those of ordinary skill in the art that the invention may also be practiced on bits carrying other superabrasive cutters, such as thermally stable polycrystalline diamond compacts, or TSPs, for example, arranged into a mosaic pattern as known in the art to simulate the cutting face of a PDC cutter. Diamond film cutters may also be employed, as well as cubic boron nitride compacts.

While the present invention has been described herein with respect to certain preferred embodiments, those of ordinary skill in the art will recognize and appreciate that it is not so limited. Rather, many additions, deletions and modifications to the preferred embodiments may be made without departing from the scope of the invention as hereinafter claimed. In addition, features from one embodiment may be combined with features of another embodiment while still being encompassed within the scope of the invention as contemplated by the inventors. Further, the invention has utility in both full-bore bits and core bits, and with different and various bit profiles as well as cutter types, configurations and mounting approaches.

What is claimed is:

1. A drill bit for subterranean drilling, comprising:
   a bit body having a centerline and including a leading end for contacting a formation during drilling and a trailing end having structure associated therewith for connecting the drill bit to a drill string;
   at least one cutter secured to the bit body over the leading end at a radial distance from the centerline; and
   at least one elongated bearing element over the leading end positioned at about the same radial distance from the centerline as the at least one cutter, the at least one elongated bearing element being dimensioned, positioned and oriented so as any transverse cross-section thereof lies substantially completely within, but at most only partially coincident with an associated transverse cross-section of a path cut in a subterranean formation by the at least one cutter by rotation of the drill bit.

2. The drill bit of claim 1, wherein the at least one cutter comprises a plurality of cutters and the at least one elongated bearing element comprises a plurality of elongated bearing elements.

3. The drill bit of claim 2, wherein at least some elongated bearing elements of the plurality are positioned to trail, as taken in a direction of intended bit rotation, a cutter of the plurality.

4. The drill bit of claim 2, wherein at least some of the elongated bearing elements of the plurality are elongated in an arc having a radius substantially equal to the respective radial distances between each elongated bearing element of the at least some elongated bearing elements and the centerline.

5. The drill bit of claim 2, wherein at least some of the elongated bearing elements of the plurality are of arcuate cross-section, taken transverse to a direction of elongation.

6. The drill bit of claim 2, wherein bearing surfaces of each of at least some of the elongated bearing elements of the plurality are oriented on at least one angle to a plane transverse to the centerline, the at least one angle being substantially the same as an angle of a path traveled by a cutter of the plurality at substantially the same radial distance to the centerline as that elongated bearing element when the drill bit is drilling at a given rate of penetration.

7. The drill bit of claim 2, wherein at least some portions of bearing surfaces of at least some of the elongated bearing elements of the plurality are provided with wear-resistant structures.

8. The drill bit of claim 7, wherein the wear-resistant structures are tungsten carbide inserts, polycrystalline diamond compacts, thermally stable polycrystalline diamond compacts, natural diamonds, diamond grit, diamond film, or cubic boron nitride compacts.

9. The drill bit of claim 1, wherein the at least one cutter is a polycrystalline diamond compact, a group of thermally stable polycrystalline diamond compacts, a diamond film cutter, or a cubic boron nitride compact.

10. The drill bit of claim 1, wherein the at least one cutter is a superabrasive cutter.

11. The drill bit of claim 10, wherein the at least one superabrasive cutter comprises a disc-shaped polycrystalline diamond table having a cutting face oriented substantially in a direction of intended bit rotation.

12. The drill bit of claim 1, wherein the at least one elongated bearing element is formed with a nonaggressive leading end, taken in a direction of intended bit rotation.

13. The drill bit of claim 12, wherein the at least one elongated bearing element is formed with a nonaggressive trailing end, taken in the direction of intended bit rotation.

14. The drill bit of claim 1, wherein the at least one elongated bearing element is positioned to trail, as taken in a direction of intended bit rotation, the at least one cutter.

15. The drill bit of claim 1, wherein the at least one elongated bearing element is elongated in an arc having a radius substantially equal to the radial distance between the at least one elongated bearing element and the centerline.

16. The drill bit of claim 1, wherein the at least one elongated bearing element is of arcuate cross-section, taken transverse to a direction of elongation.

17. The drill bit of claim 1, wherein a bearing surface of the at least one elongated bearing element is oriented on at least one angle to a plane transverse to the centerline, the at least one angle being substantially the same as an angle of a path traveled by the at least one cutter when the drill bit is drilling at a given rate of penetration.

18. The drill bit of claim 1, wherein at least some portion of a bearing surface of the at least one elongated bearing element is provided with at least one wear-resistant structure.

19. The drill bit of claim 18, wherein the at least one wear-resistant structure is a tungsten carbide insert, a polycrystalline diamond compact, a thermally stable polycrystalline diamond compact, a natural diamond, diamond grit, a diamond film, or a cubic boron nitride compact.

20. A method of drilling a subterranean formation, comprising:
disposing a rotary drill bit having a plurality of cutters fixed over a leading end thereof adjacent a subterranean formation to be drilled;
applying weight and rotating the rotary drill bit to cause the cutters of the plurality to engage the subterranean formation and cut substantially helical paths therein; and
contacting the subterranean formation with elongated bearing elements fixed over the leading end of the rotary drill bit and rotationally trailing at least some of the cutters, the contacting being effected by partial coincidence between each elongated bearing element outer periphery and the surface of each associated substantially helical path cut by each cutter of the plurality in the subterranean formation, such partial coincident contact occurring substantially completely within each associated substantially helical path.

21. The method of claim 20, further comprising placing elongated bearing surfaces of the elongated bearing elements in substantially continuous contact with the subterranean formation under application of weight to, and rotation of, the rotary drill bit.

22. A drilling structure for subterranean drilling, comprising:
a body having a centerline defining an axis of rotation and including a leading end for contacting a formation during drilling and a trailing end having structure associated therewith for connecting the drilling structure to a drill string;
at least one cutter secured to the bit body over the leading end at a radial distance from the centerline; and
at least one elongated bearing element over the leading end positioned at about the same radial distance from the centerline as the at least one cutter, the at least one elongated bearing element being dimensioned, positioned and oriented so as any transverse cross-section thereof lies substantially completely within, but at most only partially coincident with an associated transverse cross-section of a path cut in a subterranean formation by the at least one cutter by rotation of said drilling structure.

23. The drilling structure of claim 22, wherein the at least one cutter comprises a plurality of cutters and the at least one elongated bearing element comprises a plurality of elongated bearing elements.

24. The drilling structure of claim 23, wherein at least some elongated bearing elements of the plurality are positioned to trail, as taken in a direction of intended bit rotation, a cutter of the plurality.

25. The drilling structure of claim 23, wherein at least some of the elongated bearing elements of the plurality are elongated in an arc having a radius substantially equal to the respective radial distances between each elongated bearing element of the at least some elongated bearing elements and the centerline.

26. The drilling structure of claim 23, wherein at least some of the elongated bearing elements of the plurality are of arcuate cross-section, taken transverse to a direction of elongation.

27. The drilling structure of claim 23, wherein bearing surfaces of each of at least some of the elongated bearing elements of the plurality are oriented on at least one angle to a plane transverse to the centerline, the at least one angle being substantially the same as an angle of a path traveled by a cutter at substantially the same radial distance to the centerline as that elongated bearing element when the drill bit is drilling at a given rate of penetration.

28. The drilling structure of claim 23, wherein at least some portions of bearing surfaces of at least some of the elongated bearing elements of the plurality are provided with wear-resistant structures.

29. The drilling structure of claim 28, wherein the wear-resistant structures are tungsten carbide inserts, polycrystalline diamond compacts, thermally stable polycrystalline diamond compacts, natural diamonds, diamond grit, diamond film, or cubic boron nitride compacts.

30. The drilling structure of claim 22, wherein the at least one cutter is a polycrystalline diamond compact, a group of thermally stable polycrystalline diamond compacts, a diamond film cutter, or a cubic boron nitride compact.

31. The drilling structure of claim 22, wherein the at least one cutter is a superabrasive cutter.

32. The drilling structure of claim 31, wherein the at least one superabrasive cutter comprises a disc-shaped polycrystalline diamond table having a cutting face oriented substantially in a direction of intended bit rotation.

33. The drilling structure of claim 22, wherein the at least one elongated bearing element is formed with a nonaggressive leading end, taken in a direction of intended bit rotation.

34. The drilling structure of claim 33, wherein the at least one elongated bearing element is formed with a nonaggressive trailing end, taken in a direction of intended bit rotation.

35. The drilling structure of claim 22, wherein the at least one elongated bearing element is positioned to trail, as taken in a direction of intended bit rotation, the at least one cutter.

36. The drilling structure of claim 22, wherein the at least one elongated bearing element is elongated in an arc having a radius substantially equal to the radial distance between the at least one elongated bearing element and the centerline.

37. The drilling structure of claim 22, wherein the at least one elongated bearing element is of arcuate cross-section, taken transverse to a direction of elongation.

38. The drilling structure of claim 22, wherein a bearing surface of the at least one elongated bearing element is oriented on at least one angle to a plane transverse to the centerline, the at least one angle being substantially the same as an angle of the path traveled by the at least one cutter when the drilling structure is drilling at a given rate of penetration.

39. The drilling structure of claim 22, wherein at least some portion of a bearing surface of the at least one elongated bearing element is provided with at least one wear-resistant structure.

40. The drilling structure of claim 39, wherein the at least one wear-resistant structure is a tungsten carbide insert, a polycrystalline diamond compact, a thermally stable polycrystalline diamond compact, a natural diamond, diamond grit, a diamond film, or a cubic boron nitride compact.

41. A method of drilling a subterranean formation, comprising:

disposing a rotary drilling structure having a plurality of cutters fixed over at least a portion of a leading end thereof adjacent a subterranean formation to be drilled;

applying weight and rotating the rotary drilling structure to cause the cutters of the plurality to engage the subterranean formation and cut substantially helical paths therein; and contacting the subterranean formation with elongated bearing elements fixed over the leading end of the rotary drill bit and rotationally trailing at least some of the cutters, the contacting being effected by partial coincidence between each elongated bearing element outer periphery and the surface of each associated substantially helical path cut by each cutter of the plurality in the subterranean formation, such partial coincident contact occurring substantially completely within each associated substantially helical path.

42. The method of claim 41, further comprising placing elongated bearing surfaces of the elongated bearing elements in substantially continuous contact with the subterranean formation under application of weight to, and rotation of, the rotary drilling structure.

* * * * *

UNITED STATES PATENT AND TRADEMARK OFFICE
CERTIFICATE OF CORRECTION

PATENT NO. : 6,659,199 B2
DATED : December 9, 2003
INVENTOR(S) : Mohammad Swadi

It is certified that error appears in the above-identified patent and that said Letters Patent is hereby corrected as shown below:

Column 4,
Line 1, change ""matrix" -type" to -- "matrix"-type --

Column 6,
Line 57, change "13x" to -- 130x --

Column 7,
Line 31, insert a period after "thereof"

Signed and Sealed this

Twenty-eighth Day of December, 2004

JON W. DUDAS
*Director of the United States Patent and Trademark Office*